US012656120B2

(12) United States Patent
Bina et al.

(10) Patent No.: US 12,656,120 B2
(45) Date of Patent: Jun. 16, 2026

(54) SYSTEM AND METHOD FOR REMOTE INSPECTION OF A SPACE

(71) Applicant: INTERAPTIX INC., Toronto (CA)

(72) Inventors: Bardia Bina, Toronto (CA); Dae Hyun Lee, Etobicoke (CA); Tyler James Doyle, Toronto (CA); Isaac Louis Gold Berman, Toronto (CA); Parya Jafari, Toronto (CA)

(73) Assignee: INTERAPTIX INC., Toronto (CA)

( * ) Notice: Subject to any disclaimer, the term of this patent is extended or adjusted under 35 U.S.C. 154(b) by 476 days.

(21) Appl. No.: 18/001,434

(22) PCT Filed: Jun. 11, 2021

(86) PCT No.: PCT/IB2021/055174
§ 371 (c)(1),
(2) Date: Dec. 9, 2022

(87) PCT Pub. No.: WO2021/250633
PCT Pub. Date: Dec. 16, 2021

(65) Prior Publication Data
US 2023/0221120 A1 Jul. 13, 2023

Related U.S. Application Data

(60) Provisional application No. 63/107,040, filed on Oct. 29, 2020, provisional application No. 63/037,883, filed on Jun. 11, 2020.

(51) Int. Cl.
*G01C 21/16* (2006.01)
*G01C 21/00* (2006.01)
(Continued)

(52) U.S. Cl.
CPC ......... *G01C 21/165* (2013.01); *G01C 21/005* (2013.01); *G01C 21/206* (2013.01);
(Continued)

(58) Field of Classification Search
CPC .. G01C 21/165; G01C 21/005; G01C 21/206; G05B 19/41875; G05B 2219/32368;
(Continued)

(56) References Cited

U.S. PATENT DOCUMENTS 8,798,926 B2 * 8/2014 Stroila ............... G01C 21/3837
701/451
8,855,404 B2 10/2014 Doyle et al.
(Continued)

FOREIGN PATENT DOCUMENTS

EP 1840834 A2 10/2007
EP 3351927 A1 7/2018
(Continued)

OTHER PUBLICATIONS

U.S. Appl. No. 17/345,764, Systems, Devices, and Methods for Quality Control and Inspection of Parts and Assemblies, filed Jun. 11, 2021.
(Continued)

*Primary Examiner* — Mi'schita' Henson
(74) *Attorney, Agent, or Firm* — PERRY + CURRIER INC.

(57) ABSTRACT

An example method for enabling inspection of a space includes: obtaining a space map representing the space to be inspected; rendering the space map to be presented at an inspection station for the inspection of the space; in response to navigation data, navigating within the space map for the inspection of the space; in response to a selection of an inspection capture point defined in the space map, presenting data representing the space captured at the inspection capture point; and generating inspection result data for the space, the inspection result data representing results of the inspection.

9 Claims, 10 Drawing Sheets

(51) Int. Cl.
    *G01C 21/20*       (2006.01)
    *G05B 19/418*     (2006.01)

(52) U.S. Cl.
    CPC .................. *G05B 19/41875* (2013.01); *G05B 2219/32368* (2013.01)

(58) Field of Classification Search
    CPC .......... G06Q 10/06395; G06Q 10/087; G06Q 10/0875; G06Q 10/20; G06Q 30/012; G06Q 30/014; G06Q 50/04; G06T 7/74; G06T 19/00; G06T 2200/24; G06T 2207/20101; G06T 2207/30164; G06T 2219/004; G06T 7/0004; G06T 11/00; G06V 20/20; G07C 3/146
    See application file for complete search history.

(56) References Cited

U.S. PATENT DOCUMENTS

| | | | |
|---|---|---|---|
| 10,360,634 | B2 | 7/2019 | Lekas |
| 10,395,360 | B2 | 8/2019 | Kogawara |
| 10,672,089 | B2 | 6/2020 | Howe et al. |
| 10,762,511 | B1 | 9/2020 | Pope et al. |
| 11,036,984 | B1 | 6/2021 | Patangay |
| 11,132,479 | B1 | 9/2021 | Tyson, II |
| 11,203,425 | B2 * | 12/2021 | Bauer ..................... G08G 5/57 |

| | | | |
|---|---|---|---|
| 2008/0219543 | A1 | 9/2008 | Csulits et al. |
| 2014/0086464 | A1 | 3/2014 | Brockway et al. |
| 2014/0201094 | A1 | 7/2014 | Herrington et al. |
| 2015/0262391 | A1 | 9/2015 | Chau |
| 2015/0350553 | A1 | 12/2015 | Jana et al. |
| 2016/0055602 | A1 | 2/2016 | Howe et al. |
| 2016/0282856 | A1 | 9/2016 | Wachs |
| 2016/0344877 | A1 | 11/2016 | Altamirano et al. |
| 2017/0018403 | A1 | 1/2017 | Koronel et al. |
| 2018/0002010 | A1 | 1/2018 | Bauer et al. |
| 2019/0215494 | A1 | 7/2019 | Oami et al. |
| 2019/0266718 | A1 | 8/2019 | Stancato et al. |
| 2019/0294975 | A1 | 9/2019 | Sachs |
| 2019/0295246 | A1 | 9/2019 | Smith et al. |
| 2020/0134911 | A1 | 4/2020 | van Hoff et al. |
| 2021/0096975 | A1 | 4/2021 | DeLuca et al. |
| 2021/0342770 | A1 | 11/2021 | Li et al. |

FOREIGN PATENT DOCUMENTS

| | | | | |
|---|---|---|---|---|
| EP | 4220087 | A1 * | 8/2023 | ........... G01C 21/206 |
| WO | WO-2018183709 | A1 | 10/2018 | |

OTHER PUBLICATIONS

U.S. Appl. No. 18/001,417, System and Method for Manufacturing and Maintenance, filed Dec. 9, 2022.

* cited by examiner

400

405
Orient data capture
device

410
Render inspection
capture points

415
Render guide frame

420
Aligned?      N

Y

425
Capture data

SYSTEM AND METHOD FOR REMOTE INSPECTION OF A SPACE

CROSS REFERENCE TO RELATED APPLICATIONS

This application claims priority to U.S. Provisional Application No. 63/037,883, filed Jun. 11, 2020 and U.S. Provisional Application No. 63/107,040, filed Oct. 29, 2020, the entirety of which are incorporated herein by reference.

FIELD

The specification relates generally to systems and methods of inspecting spaces for compliance with regulatory requirements and to maintain a record of the inspection, and more particularly to systems and methods of inspecting spaces remotely using three-dimensional models and data captures.

BACKGROUND

Organizations around the globe build policies and procedures to maintain compliance with government regulations (i.e. OSHA in the US), ISO Standards (i.e. ISO 9001 Quality Management), and internal company goals and objectives. The policies and procedures are referred to as 'management systems.' On periodic intervals, internal and external resources will perform point in time inspections and audits to determine compliance with the management system. Typically these audits involve one or more internal or external inspectors travelling onsite to collect observational evidence to determine compliance. These audits can take multiple days and multiple visits depending on scope. These audits incur travel costs, lost production time, lost coverage in locations where experts are needed to travel to other sites, lost production time due to the disruption of the audit, and can incur contract fees if third parties are required. Further, in many circumstances, such as for security reasons, during a pandemic, clean room conditions, etc., it may not be possible to permit an external inspector to physically visit the space.

SUMMARY

According to an aspect of the present invention, a method for enabling inspection of a space includes: obtaining a space map representing the space to be inspected; rendering the space map to be presented at an inspection station for the inspection of the space; in response to navigation data, navigating within the space map for the inspection of the space; in response to a selection of an inspection capture point defined in the model, presenting data representing the space captured at the inspection capture point; and generating inspection result data for the space, the inspection result data representing results of the inspection.

According to another aspect of the present invention, a non-transitory machine-readable storage medium stores machine-readable instructions, which when executed, cause a data capture device to: retrieve a space map representing a space to be inspected; retrieve at least one inspection capture point defined in the space represented by the space map, the at least one inspection capture point representing a location within the space from which data representing the space is to be captured; capture data representing the space at the at least one inspection capture point; and send the captured data to a server to be transmitted to an inspection station for inspection of the space.

According to another aspect of the present invention, a system for enabling inspection of a space includes: a server to store a space map of the space to be inspected; a data capture device in communication with the server, the data capture device to: capture data representing the space at one or more inspection capture points; and send the captured data and locations of the one or more inspection capture points to the server; an inspection station in communication with the server, the inspection station to: obtain the space map and the captured data associated with the inspection capture points from the server; locate the inspection capture points within the three dimensional model; and present the space map and the captured data for inspection of the space.

BRIEF DESCRIPTION OF DRAWINGS

Implementations of aspects of the present invention are described with reference to the following figures, in which.

DETAILED DESCRIPTION

In order to reduce the cost and time expense of sending inspectors to each location or space to be inspected, and for a variety of other reasons a remote inspection system may be desired. Some known remote inspection systems pair remotely located inspectors with users at the location to be inspected to perform a real-time communication session, such as over a video call, to perform the inspection. However, such systems still require that users at both ends be available at the same time. Other known systems can provide a set of instructions, rules or templates defining locations at which images or videos are to be captured and uploaded for a remotely located inspector to review at a later time. However, discrete images or video segments can make it difficult to understand the space as a whole and contextualize the images and video segments within the space. Further, the initial identification of areas or items in the captured images or video segments which could pose a concern require a follow up set of instructions or templates to be sent to the local user for following up on and require a subsequent re-examination by the inspector, which may not occur for days, by which time the status of the situation may have changed. Additionally, when the user is in control of the data capture, it can be easier to evade certain areas of the space to improve the chances of approval and compliance with regulatory requirements.

Accordingly, an example system for remote inspection of a space in accordance with the present invention provides a space map of a space to be inspected, to provide a holistic view of the space to allow data captured at specific inspection capture points to be better contextualized within the space. The space map is preferably a model, such as a three-dimensional model, but in other examples can be a mesh representation, a two-dimensional floor plan, or the like. The space map further makes it difficult to avoid certain regions of the actual space, since gaps in data capture for the model will be readily apparent. The system further provides a data capture application preferably with augmented reality items to facilitate the capture of data from the appropriate locations, and in the appropriate directions. The system can further maintain a record of the captured data for the space and inspection results from previous inspections, providing a historical record of the space and previous inspections.

Figure 1:
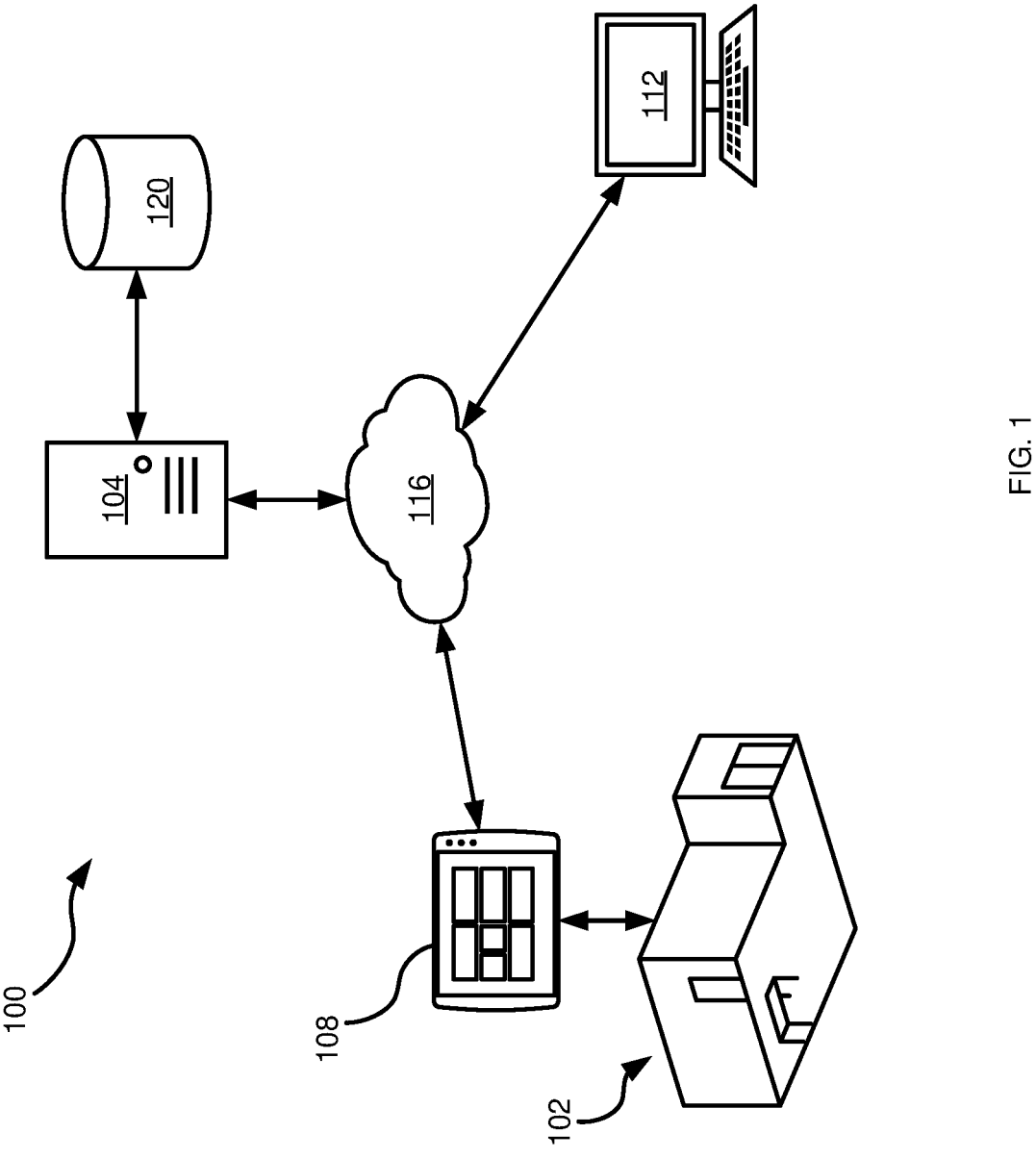
FIG. 1 depicts a block diagram of an example system for enabling remote inspection of a space.

FIG. 1 depicts a block diagram of an example system 100 to enable remote inspection of a space 102. For example, space 102 can be a factory or other industrial facility, an office, a new building, a private residence, or the like.

System 100 includes a server 104 configured to facilitate the remote inspection, a data capture device 108 configured to capture data at space 102 to be inspected, and an inspection station 112 configured to present relevant data for the remote inspection. Server 104, data capture device 108 and inspection station 112 are preferably in communication via a network 116.

Server 104 is generally configured to support and facilitate the remote inspection of space 102 by communicating inspection data between data capture device 108 and inspection station 112. Server 104 can be any suitable server or computing environment, including a cloud-based server, a series of cooperating servers, and the like. For example, server 104 can be a personal computer running a Linux operating system, an instance of a Microsoft Azure virtual machine, etc. In particular, server 104 includes a processor and a memory storing machine-readable instructions which, when executed, cause server 104 to facilitate the remote inspection of space 102, as described herein. Server 104 can also include a database 120 configured to store a previously defined or obtained three-dimensional model of space 102, the inspection data, including photographs, x-ray images, space maps, including three-dimensional computer models (e.g., SolidWorks™ CAD models or the like), videos, text records, depth information, annotations (as described below), serial numbers and part numbers, and the like. For example, database 120 can be one or more instances of MySQL or any other suitable database. Server 104 can also include a suitable communications interface (e.g., including transmitters, receivers, network interface devices and the like) to communicate with other computing devices, such as data capture device 108 and inspection station 112 via network 116.

Data capture device 108 is a device capable of capturing relevant data such as visual data, depth data, audio data, other sensor data, combinations of the above and the like to allow for the remote inspection of space 102. Data capture device 108 can therefore include components capable of capturing said data, such as one or more imaging devices (e.g., optical cameras), distancing devices (e.g., LIDAR devices or multiple cameras which cooperate to allow for stereoscopic imaging), microphones, and the like. For example, data capture device 108 can be an IPad Pro, manufactured by Apple, which includes a LIDAR system and cameras, a head-mounted augmented reality system, such as a Microsoft Hololens™, a camera-equipped hand-held device such as a smartphone or tablet, a computing device with interconnected imaging and distancing devices (e.g., an optical camera and a LIDAR device), or the like. The actual configuration of data capture device 108 is not particularly limited, and a variety of other possible configurations will be apparent to those of skill in the art in view of the discussion below.

Data capture device 108 additionally implements an application which facilitates the capturing of appropriate data for the remote inspection of space 102. Accordingly, data capture device 108 can additionally include a processor and non-transitory machine-readable storage medium, such as a memory, storing said application having machine-readable instructions which, when executed, cause data capture device 108 to facilitate the data capture operation.

Data capture device 108 can also include a display, such as an LCD (liquid crystal display), an LED (light-emitting diode) display, a heads-up display, or the like to present a user with visual indicators to facilitate the data capture operation. Data capture device 108 also includes a suitable communications interface to communicate with other computing devices, such as server 104 via network 116.

Inspection station 112 is generally configured to present data representing space 102 to be inspected, receive input from an inspector user regarding inspection results, and communicate said results to server 104 via network 116. Inspection station 112 can be a computing device, such as a laptop computer, a desktop computer, a tablet, a mobile phone, a kiosk, or the like. In particular, inspection station 112 includes a processor and a memory, as well as a suitable communications interface to communicate with other computing devices, such as server 104 via network 116. Inspection station 112 further includes one or more output devices, such as a display, a speaker, and the like, as well as one or more input devices, such as a keyboard, a mouse, a touch-sensitive display, and the like.

Network 116 can be any suitable network including wired or wireless networks, including wide-area networks, such as the Internet, mobile networks, local area networks employing routers, switches, wireless access points, combinations of the above, and the like.

Figure 2:
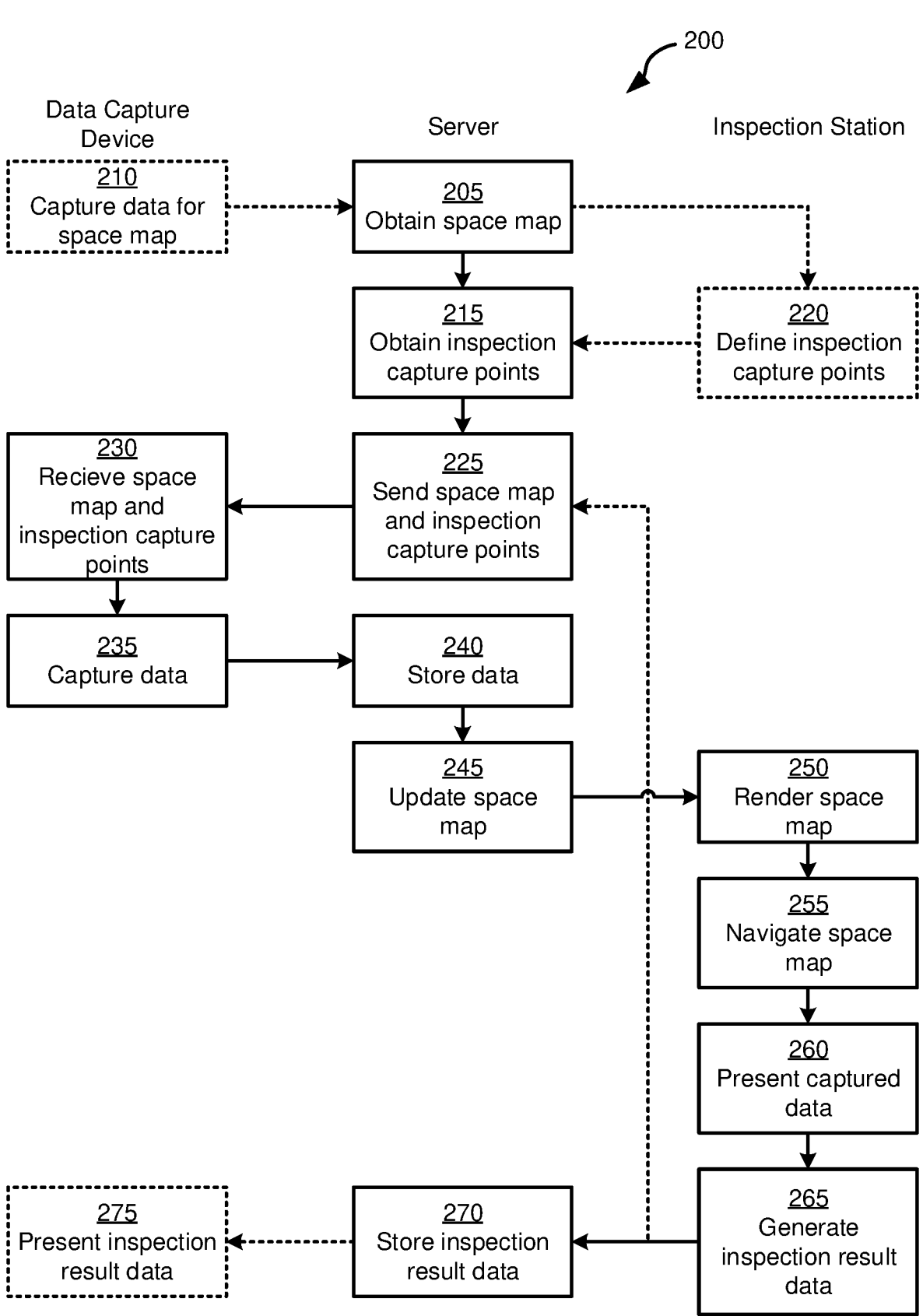
FIG. 2 depicts a flowchart of an example method of enabling remote inspection of a space in the system of FIG. 1.

Turning now to FIG. 2, a flowchart of a method 200 of remote inspection of a space is depicted. Method 200 will be described in conjunction with its performance in system 100. In other examples, method 200 can be performed in other suitable systems. In some examples, the blocks of method 200 can be performed concurrently and/or in an order different from that depicted, and accordingly are referred to as blocks and not steps.

At block 205, server 104 obtains a space map representing space 102 to be inspected. The space map can be any digital representation of the space. As described herein, the space map is preferably a digital twin or three-dimensional model, such as a CAD model of space 102 previously created, a mesh representation of space 102 captured with data capture device 108, or the like, however the actual structure of the space map is not particularly limited. In some examples, the space map can be a two-dimensional model, such as a floor plan. The space map can be predefined and uploaded to server 104 and retrieved from database 116. Data capture device 108 can employ a LIDAR scanner, photogrammetry or other suitable system to capture data, as described in more detail below, which data capture device 108, or server 104, can use to construct the desired space map of space 102. In other examples, space 102 may not have an existing associated space map, or may require a current representation to be acquired for the inspection, and hence may require a space map to be generated. Thus, optionally, at block 210, data capture device 108 is employed to capture the necessary data to generate the space map, as further described below.

In particular, at block 210, data capture device 108 can capture depth and other data to generate a space map representing space 102. For example, data capture device 108 can utilize a LIDAR device or the like to measure the distances of surfaces within space 102 relative to data capture device 108. In other examples, data capture device 108 can utilize stereoscopic imaging to measure these distances. In order to achieve a representation of space 102, a user with data capture device 108 will move around space 102 aiming data capture device 108 at different surfaces to acquire the depth, dimensional and positional data used to create a space map. For example, data capture device 108 may use the depth data captured to create a point cloud from which a three-dimensional model is generated. The three-dimensional model may be generated from the captured data in real time at data capture device 108, or data capture device 108 may send the point cloud to another computing device, such as server 104, to generate the three-dimensional model based on the point cloud. In other examples, data capture device 108, or server 104 may generate a different space map representing the space from the data captured at data capture device 108.

At block 215, server 104 obtains inspection capture points defined in space 102 to be inspected. The inspection capture points represent locations within space 102 represented by the space map from which data representing space 102 is to be captured. That is, at each inspection capture point, system 100 captures and stores inspection data, which can comprise absolute and/or relative locations, images, depth data, spatial relationships, and the like. The inspection capture points can be defined relative to the space map and can include a location and a direction/orientation defining a frustum for the camera of data capture device 108.

For example, if the space map represents a room in an office building, the inspection capture points can define locations within the room at which it is desired to capture inspection data. For example, one or more inspection capture points could be defined about six feet away from each door, window or other entryway to space 102 being inspected, with it being specified that capture device 108 should be at a height of about six feet from the floor of the room and oriented in a direction towards the given door, window or other entryway when the image and/or other inspection data is captured. In other examples, other relevant inspection capture points having different locations and orientations can be defined according to the requirements for inspection of space 102.

In addition to a location and orientation, the inspection capture points can additionally be associated with one or more types of data to be captured at the specified point (e.g., a still image, a video clip, an audio recording, or the like).

Further, in other cases, the inspection capture points can be described textually for a user to interpret, rather than being defined at a specific location and/or orientation within space 102. In such cases the data captured by the user with capture device 108 will include both the captured data and the location and orientation at which it was captured by the user.

In some examples, the inspection capture points can be defined according to predefined rules. For example, server 104 can use an appropriate detection algorithm to identify a set of predefined features (e.g., entryways including doors and windows) in the space map for which data should be captured. For example, server 104 can employ one or more artificial intelligence engines implementing machine learning, neural networks, or the like to identify features of interest for which data should be captured. Server 104 can then define an appropriate inspection capture point in the space map to ensure that the desired inspection data point data is appropriately captured. In other examples, server 104 can use a predefined template to identify one or more inspection capture points. For example, where space 102 is inspected on a recurring or regular basis, server 104 can copy the inspection capture points previously defined to the space map and designate the mapped points as the inspection capture points for the current iteration of the inspection.

In still further examples, the inspection capture points can be defined by an inspector operating inspection station 112. That is, at block 220, inspection station 112 can retrieve the space map and present it to the inspector operating inspection station 112 who may then navigate about the space map using any of a variety of known navigation techniques and can define one or more inspection data capture points as desired. Inspection station 112 can send the defined inspection capture points to server 104 for storage and further processing. The inspection station 112 can send the inspection capture points to the server 104 in real time as they are defined. The actual capture of data with capture device 108 at defined inspection data capture points is discussed in more detail below.

To facilitate easy recognition by the inspector of features within space 102, it may be preferable to present a three-dimensional model to the inspector, if available. In some examples, inspection station 112 can, if it is present, additionally retrieve image data captured and associated with the three-dimensional and use the image data to texture a three-dimensional model to generate a more visually accurate model. In other examples, rather than performing the texturing at inspection station 112, server 104 can use the image data to texture the three-dimensional model.

Once the space map and inspection capture points are defined, method 200 proceeds to block 225 where server 104 sends the space map and the inspection capture points to data capture device 108 to capture data representing space 102.

At block 230, data capture device 108 receives the space map and inspection capture points from server 104. Data capture device 108 can interactively retrieve the space map and inspection capture points as needed, or data capture device 108 can store the space map and inspection capture points locally on data capture device 108 to allow data capture device 108 to proceed with the data capture operation when data capture device 108 is offline. That is, data capture device 108 can retrieve the space map and inspection capture points when it is connected to network 116 and can subsequently disconnect from network 116 for the data capture operation (e.g., if space 102 to be inspected is remote and/or does not support a stable connection to network 116).

In some examples, prior to proceeding to block 235 and entering an inspection mode, data capture device 108 can display to the user the space map and the inspection capture points defined relative to the space map as an overview to allow the user of data capture device 108 to obtain a general sense of the locations of the inspection capture point. The space map preferably is a textured three-dimensional model with the textures corresponding to space 102 if possible, to assist the user in relating the space map, and defined inspection data capture points, to space 102, but it is also contemplated that in some cases the space map may only be a wireframe or mesh representation of space 102, or a two-dimensional floor plan.

At block 235, the user operates data capture device 108 to capture data representing space 102 at the defined inspection capture points. The user can navigate to the inspection capture point, position data capture device 108 at the appropriate orientation and capture inspection data. The navigation to the correct inspection capture point and positioning of data capture device 108 at the appropriate angle may be guided by augmented reality elements displayed on data capture device 108, as described in more detail below.

It will be appreciated that in other examples, other alternatives are contemplated. For example, rather than having predefined inspection capture points, a user may simply load the space map of space 102 at data capture device 108 and proceed to capture data at block 235 without any guidance as to specific or predefined inspection capture points.

After capturing the inspection data, data capture device 108 sends the captured data to server 104 for further processing, and in particular, to be transmitted to inspection station 112 for inspection of space 102. In some examples, data capture device 108 can send the captured data to server 104 in real time as the inspection data is captured at each defined inspection data point. As will be appreciated, in examples where the data capture operation at block 235 is performed offline, data capture device 108 can store the captured inspection data locally until it is able to connect to network 116 and send the captured data to server 104.

In some examples, in addition to capturing data at the predefined inspection capture points, a user of data capture device 108 can manually capture "ad hoc" inspection data at any other location in space 102 which the user thinks may be of interest to the inspector. In such an event, data capture device 108 can send the ad hoc captured inspection data, along with the location and orientation of capture device 108 during the ad hoc data capture event.

At block 240, server 104 receives and stores the captured inspection data received from data capture device 108. In particular, server 104 can store the captured inspection data in association with the corresponding inspection capture point, if any, at which the data was captured.

At block 245, server 104 updates the space map of space 102 to be inspected to include the inspection capture points and the inspection data associated therewith. That is, the inspection capture points can be defined within the space map at the appropriate location. Each inspection capture point is associated with the inspection data captured at the inspection capture point or an indication that no data has yet been captured for the inspection capture point, and other relevant information.

Optionally, in examples where the three-dimensional model is a mesh, the server 104 may additionally texture the mesh. For example, server 104 can utilize image data representing space 102, for example captured during the capture of the depth data for generation of the mesh and, for each face of the mesh, apply the corresponding image data. In other examples, where captured data stored at block 240 includes image data, server 104 can determine, for each face of the mesh, whether at least one captured image includes the face, and when the determination is affirmative, server 104 can use the image data from one of the captured images to texture that face of the mesh. Server 104 can additionally apply smoothing algorithms to reduce visibility of seams or edges between faces. As will be appreciated, in other examples, other texture mapping methods can also be applicable.

At block 250, inspection station 112 retrieves the updated space map from server 104 to be presented at inspection station 112. Thus, inspection station 112 can display the space map, including the inspection capture points located within the space map. For example, the inspection capture points can be rendered as data capture point indicators. Preferably, the indicators can represent both the location of the inspection capture point (i.e., by being located spatially within the space map at the inspection capture point) as well as the direction of data capture (e.g., by a line or as defined by a direction of a frustum, as described below).

At block 255, inspection station 112 can present the space map to the inspector to allow for navigation around the space map. That is, the inspector operating the inspection station 112 may then navigate about the space map using any of a variety of known navigation techniques. For example, the inspector can indicate a direction of movement, a rotation, a scaling request, or the like to cause inspection station 112 to change the view of the space map depicted to correspond with the view at the location to which the inspector navigated. The navigation and display of the data capture point indicators thus allows the inspector to intuitively and easily understand the positioning and orientation of the data capture device during the data capture operation.

By presenting space 102 as a space map, the inspector is provided with an intuitive sense of the layout, orientation and context of space 102, the locations of the data captures within space 102, and an ability to navigate in space 102. In particular, rendering space 102 as a space map reduces the likelihood that a user operating data capture device 108 can intentionally hide or avoid certain areas of space 102, since such absences will be readily apparent in the space map rendering.

At block 260, in response to a selection of an inspection capture point, inspection station 112 can present the data captured at the selected inspection capture point. For example, inspection station 112 can display an image captured at the inspection capture point or play an audio or video clip. In particular, when the data captured includes image data, the data capture point indicator corresponding to the selected inspection capture point can expand from the small pyramid to the larger pyramid including an indication of the plane of the captured image.

At block 265, inspection station 112 generates inspection result data based on input from the inspector. The inspection result data can include annotations, comments, regulatory links or other integration with regulations, new data capture requests, and the like.

If the inspector detects faults or regulatory issues in space 102 being inspected, the inspector can annotate the images and/or the space map to provide feedback and instructions to on-site users.

For example, the inspector can select an annotation tool, and draw or apply an annotation directly on a selected image. The annotations can include freehand drawings, text, symbols, or other suitable depictions which can appear as augmented reality items overlaid on the three-dimensional model.

To facilitate understanding of the annotations, the annotations are preferably augmented reality elements. For example, when the space map is a three-dimensional model, the annotations may be applied to the current view of the three-dimensional model. In such examples, inspection station 112 will map the annotations to the nearest underlying surface. That is, the annotation is assumed to be located on the surface over which the annotation lies. In other examples, the inspector can define a viewpoint frustum and plane on which the annotation is to be located.

The annotations can then be stored as part of the space map and can appear in the space map presented to the inspector in the user interface at inspection station 112 or at other presentations of the space map, for example at data capture device 108 or other computing devices. In other examples, the annotations can be associated with a specific image or inspection capture point and may only be displayed when the inspection capture point is selected.

In the event that the inspector determines that the captured data is insufficient to complete the inspection, the inspection result data can include new data capture requests. To generate a new data capture request, the inspector can navigate, in the space map, to a desired view, and select the view for the new data capture request. Based on the current position within the space map, inspection station 112 defines a new inspection capture point. For example, inspection station 112 may take the current view of the space map at the time of the new data capture request definition, inspection station 112 defines a new inspection capture point and maps it to the space map. Inspection station 112 further defines a direction for the inspection capture point. The inspector can input additional information in the new data capture request to be associated with the inspection capture point, such as a type of data to be captured, special instructions for the data capture operation, or the like.

In addition to annotations and new data capture requests, other information, such as comments in the form of text, audio files, images, or the like can also be stored in association with the three-dimensional model generally, a specific inspection capture point, a new data capture request, or a specific annotation.

In some examples, the user interface at inspection station 112 can provide regulatory integration for the inspection result data. For example, the inspector may be able to associate captured data with a checklist item of regulatory requirements to indicate that the captured data demonstrates either completion of the regulatory requirement or an identified issue associated with the regulatory requirement. Additionally, when creating an annotation or comment, the user interface can provide the inspector with the ability to link relevant sections of the regulations. In other examples, the integration of the inspection result data with regulations may be assisted by artificial intelligence or machine learning algorithms.

After generating the inspection result data, inspection station 112 can send the inspection result data to server 104. If the inspection result data includes new inspection capture points, server 104 can return to block 225 to resend the space map and the new inspection capture points to data capture device 108.

Data capture device 108 can capture the data at the new inspection capture points. Additionally, during the data capture operation, data capture device 108 can additionally obtain the annotations received as part of the inspection result data and render the annotations as overlays to the current data capture view.

At block 270, server 104 stores the inspection result data, including any annotations, comments, new data capture requests, regulatory requirements, associations therebetween and the like.

In some examples, server 104 can additionally automatically generate a report with the inspection result data. For example, the report can be based on a template of regulatory requirements and can aggregate the completion and/or failure of each requirement, as well as associated captured data, annotations and comments. Other manners of generating reports with the results of the inspection will also be apparent to those of skill in the art.

Server 104 can optionally send the inspection result data and/or the generated report to data capture device 108, and one or more additional client devices.

At block 275, data capture device 108 can present the inspection result data. For example, data capture device 108 can present the generated report. Alternately or additionally, the inspection result data can be integrated with the space map, and data capture device 108 can present the space map with the annotations, comments and other inspection result data integrated therein.

Figure 3A:
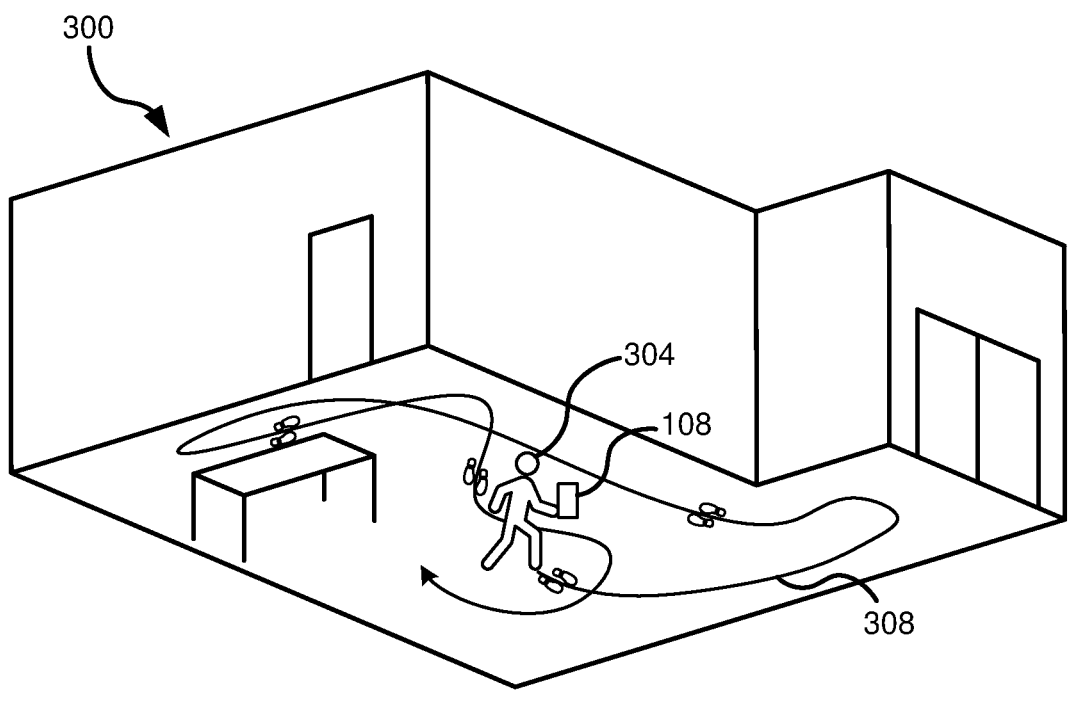
FIGS. 3A and 3B depict a schematic diagram of capturing a mesh of a space at block 210 of the method of FIG. 2.

FIG. 3A depicts a schematic view of a space 300 to be inspected shown in cutaway view, with its near walls omitted. A user 304 controlling data capture device 108 navigates a path 308 around space 300 to capture data at data capture device 108 for generating a space map. Path 308 can be defined by the server 104 and user 304 may be guided along path 308 by data capture device 108 or user 304 may create path 308 on an ad-hoc basis. As user 304 moves along path 308, data capture device 108 captures depth data, position data, and other data to generate a space map of the walls, doors, floor, and other objects in space 300. In some examples, while capturing the data for the space map, data capture device 108 can implement a space map generator which operates in real time to generate the space map from the captured depth and other data. For example, if the space map is a mesh, data capture device may implement SLAM, Photogrammetry, surface reconstruction from point clouds, or the like to generate the mesh. In such examples where the space map is generated in real time, data capture device 108 can display a data capture view (i.e., representing the view of an imaging device or the like of data capture device 108) with an overlay of the existing space map. That is, as user 304 navigates space 300, user 304 can visualize on data capture device 108, the extent of completion of the space map of space 300. In other examples, data capture device 108 can simply store the depth and other data to be transmitted to server 104 or to another computing device which operates to generate the space map.

Figure 3B:
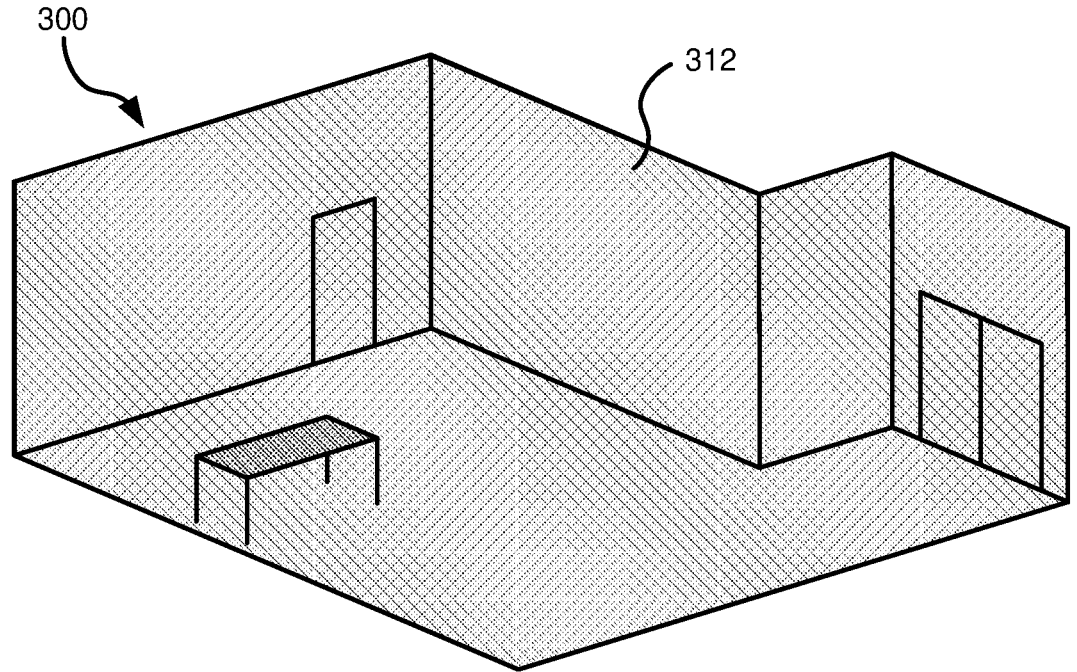

FIG. 3B is a schematic diagram of an example mesh 312 of space 300 once the generation of the mesh is complete. In some examples, in addition to capturing depth data while capturing the mesh, data capture device 108 can additionally capture image data to allow the mesh to be textured.

Figure 4:
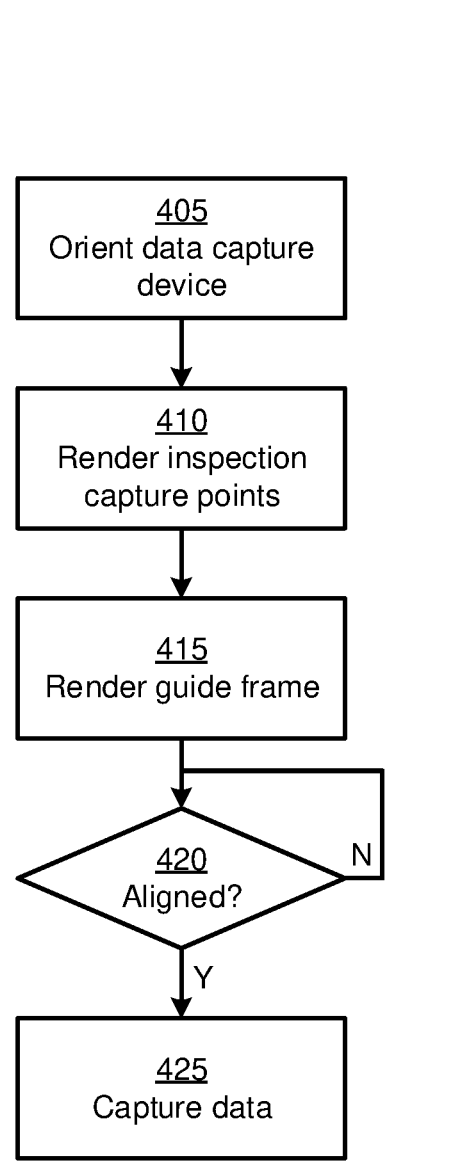
FIG. 4 depicts a flowchart of an example method of capturing data at block 235 of the method of FIG. 2.

Referring now to FIG. 4, a flowchart of an example method 400 of capturing data capture is depicted. The method 400 can be implemented at block 235 of method 200. It will be understood that in other examples, the user may capture data in a different manner.

At block 405, the user operates data capture device 108 to localize data capture device 108 in space 102 or space 300. For example, data capture device 108 can use data from a gyroscope of data capture device 108 and a predefined localization point of the space map to determine where data capture device 108 is located in space 102 or space 300. The user can locate data capture device 108 at the predefined localization point within the space, in order to enable data capture device 108 to subsequently guide the user to locate data capture device 108 at the defined location and in the defined orientation as described below.

At block 410, data capture device 108 renders an inspection capture point icon at each inspection capture point. In particular, data capture device 108 can display a current data capture view representing the data (e.g., image data) that is within the current field of view of data capture device 108.

Having oriented data capture device 108 in space 102, data capture device 108 can continue to process the captured data from the current data capture view to maintain its orientation relative to space 102. Based on the current orientation of data capture device 108 the inspection capture points defined in space 102, data capture device 108 can render the inspection capture point icons as overlays to the current data capture view when the corresponding inspection capture point is within the field of view of data capture device 108.

At block 415, upon detecting that data capture device 108 is located at the inspection capture point, data capture device 108 renders a guide frame to assist the user with aligning data capture device 108 with the given direction in which data is to be captured at the inspection capture point. For example, the guide frame can be produced using similar tracking techniques as used to orient and track the location of data capture device 108 in space 102. The guide frame can therefore be displayed similarly to the inspection capture point icon, as an overlay to the current data capture view.

In some examples, in addition to a guide frame, data capture device 108 can additionally display a current position indicator. The current position indicator can be defined in a predefined position relative to the current data capture view (e.g., a square centered about the current data capture view). The current position indicator provides a visual cue to the user of data capture device 108 as to the current alignment relative to the desired alignment of the guide frame. That is, when the current position indicator is aligned with the guide frame, data capture device 108 is oriented in the direction specified for data capture at the inspection capture point.

In other examples, other manners of prompting alignment of data capture device 108 with the inspection capture point are contemplated. For example, data capture device 108 could show the direction with the largest discrepancy until data capture device 108 is within a specified threshold or show the rotational positional differences and allow the user to adjust the position of data capture device 108 accordingly.

At block 420, data capture device 108 determines whether the current data capture view is aligned with the direction in which data is to be captured at the inspection capture point. If the determination is negative, and data capture device 108 is not aligned, data capture device 108 continues to wait for alignment, and can repeat execution of block 420 after a predefined period of time (e.g., every second, every 5 seconds), or on a continuous basis.

If the determination at block 420 is affirmative, and data capture device 108 is aligned with the direction in which data is to be captured at the inspection capture point, data capture device 108 proceeds to block 425. At block 425, data capture device 108 captures data representing space 102. In particular, having oriented data capture device 108 at block 410 and aligned data capture device 108 in the specified direction at block 415, the data captured at 425 represents space 102 as perceived from the inspection capture point in the specified direction.

In some examples, the data capture at block 425 can be performed automatically upon detection of alignment of data capture device 108. In other examples, a user can provide an input to data capture device 108 to trigger the data capture. The data captured can be image data (i.e., an image represented by the current data capture view), and in other examples, can be, additionally or alternatively, video data, audio data, or other data representing space 102.

Figure 5:
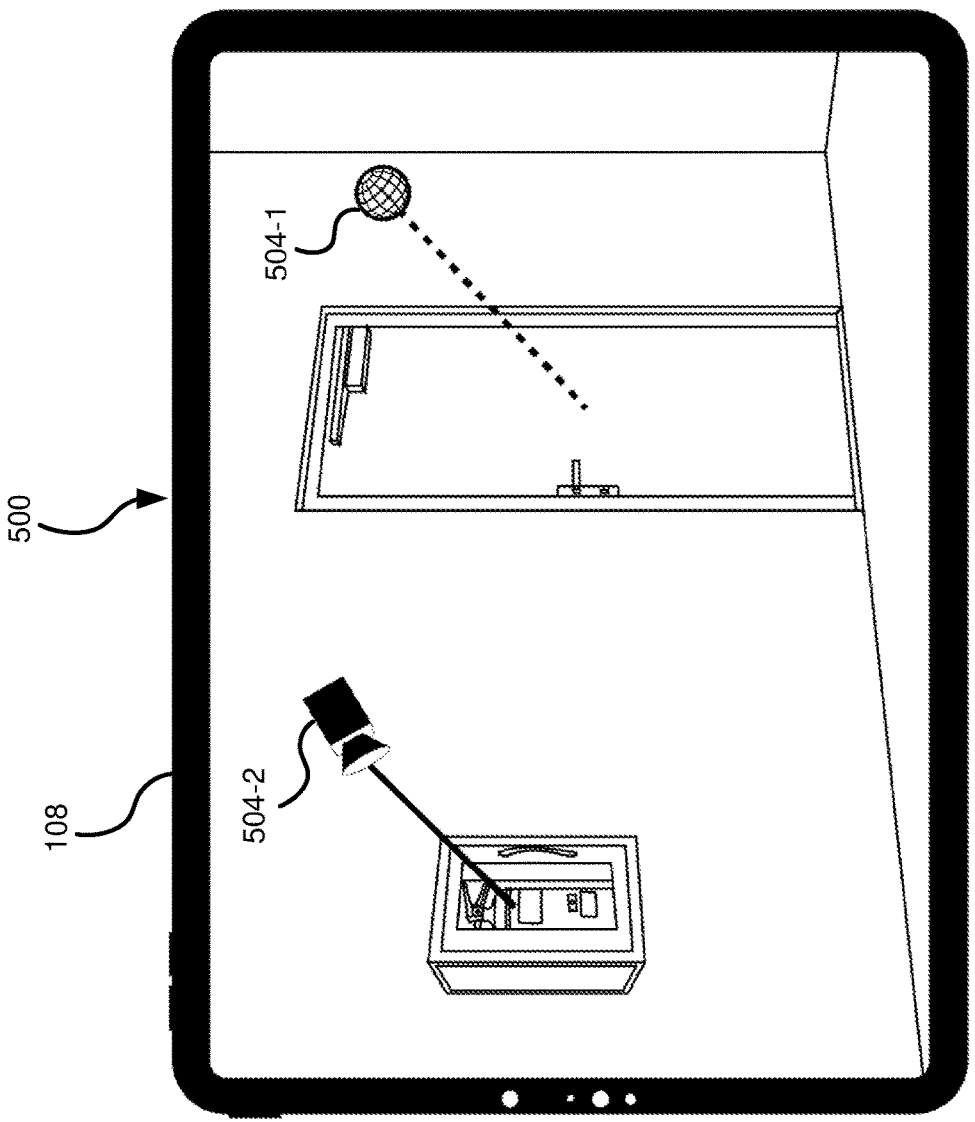
FIG. 5 depicts an example data capture view during execution of block 410 of the method of FIG. 4.

Referring now to FIG. 5, an example view of data capture device 108 during execution of block 410 of method 400 is depicted. Data capture device 108 displays a current data capture view 500 of a portion of a space, such as space 300. Data capture device 108 further displays two inspection capture point icons 504-1 and 504-2 (referred to generically as an inspection capture point icon 504 and collectively as inspection capture point icons 504—this nomenclature is also used elsewhere herein) representing two inspection capture points. Each inspection capture point icon 504 defines a location (i.e., represented in the current example by the sphere/camera), as well as a direction (i.e., represented in the current example by the line extending from the sphere/camera). Inspection capture point icons 504 can therefore appear as an augmented reality item in current data capture view 500. Advantageously, this allows for an intuitive prompt for the user to locate and move towards the inspection capture point.

Further, as can be seen, inspection capture point icons 504 can have different symbols representing the inspection capture points, based for example on the type of data to be captured, whether or not data has been captured, or other relevant factors. In the present example, the sphere of inspection capture point icon 504-1 represents an inspection capture point for which no data has yet been captured, while the camera of inspection capture point icon 504-2 represents an inspection capture point for which image data has already been captured.

Figure 6:
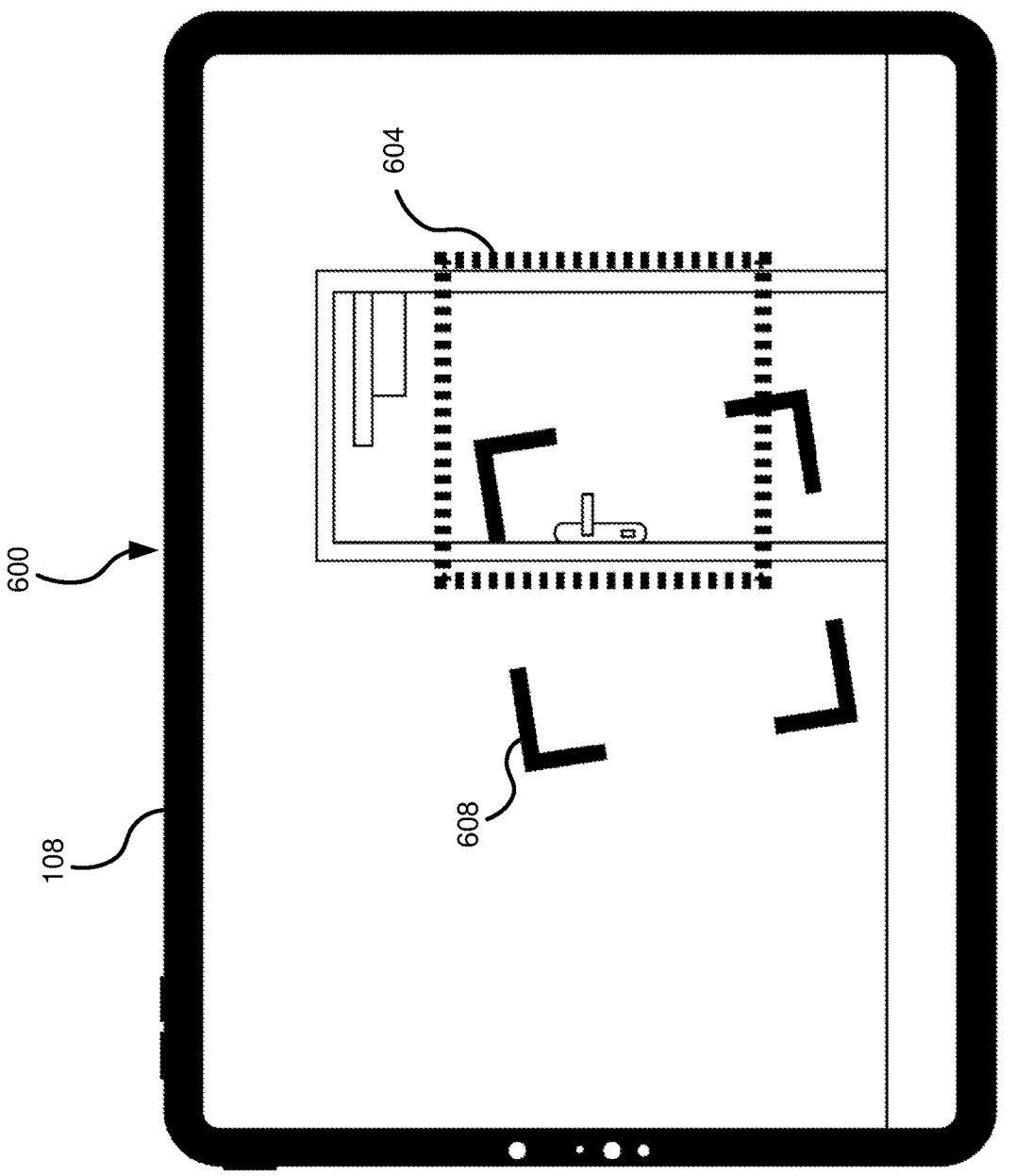
FIG. 6 depicts an example data capture view during execution of block 415 of the method of FIG. 4.

Referring now to FIG. 6, an example view of data capture device 108 during the alignment operation at block 415 of method 400 is depicted. Data capture device 108 displays a current data capture view 600 of a portion of a space, such as space 300. Data capture device 108 further displays a guide frame 604 representing the direction in which data capture device 108 is to be oriented (i.e., as specified by the inspection capture point), and a current position indicator 608 representing the direction in which data capture device 108 is currently oriented. As can be seen, in the present example, guide frame 604 and current position indicator 608 are rendered as overlays on the current data capture view 600 and can appear as augmented reality items in current data capture view 600. As with the inspection capture point icons, the rendering of guide frame 604 and current position indicator 608 allows for an intuitive prompt for the user to orient data capture device 108 in the correct direction at the inspection capture point.

Figure 7:
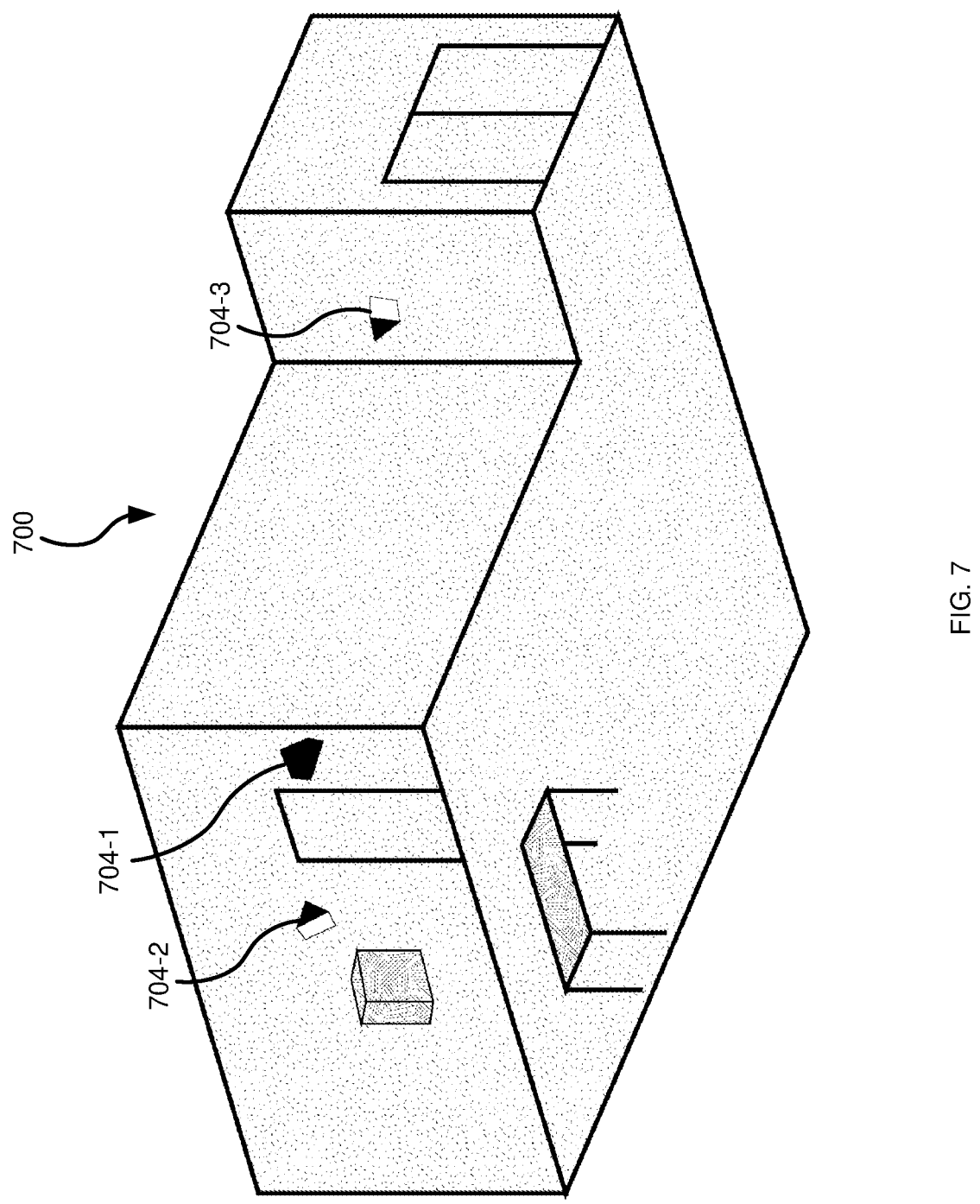
FIG. 7 depicts an example three-dimensional model rendered at block 250 of the method of FIG. 2.

Referring now to FIG. 7, an example three-dimensional model 700 of a space, such as space 300, is depicted. The three-dimensional model 700 includes data capture point indicators 704-1, 704-2, and 704-3. In the illustrated example, indicators 704 are small pyramids positioned at an inspection capture point. The pyramids can be extended or expanded to larger pyramids as further shown and described below. In other words, the small pyramids represent a summit portion of the larger pyramids and have the same apex and a base parallel to the larger pyramids. The larger pyramids, in turn, represent an image captured at the inspection capture point. Specifically, the apex of the pyramid represents the location of the inspection capture point, while the base of the pyramid generally represents the plane of the image captured. In other words, the frustum defined between the base of the small pyramid and the larger pyramid represents the viewing frustum of data capture device 108. As will be apparent, the frustum is also indicative of the direction in which the image was captured.

Figure 8:
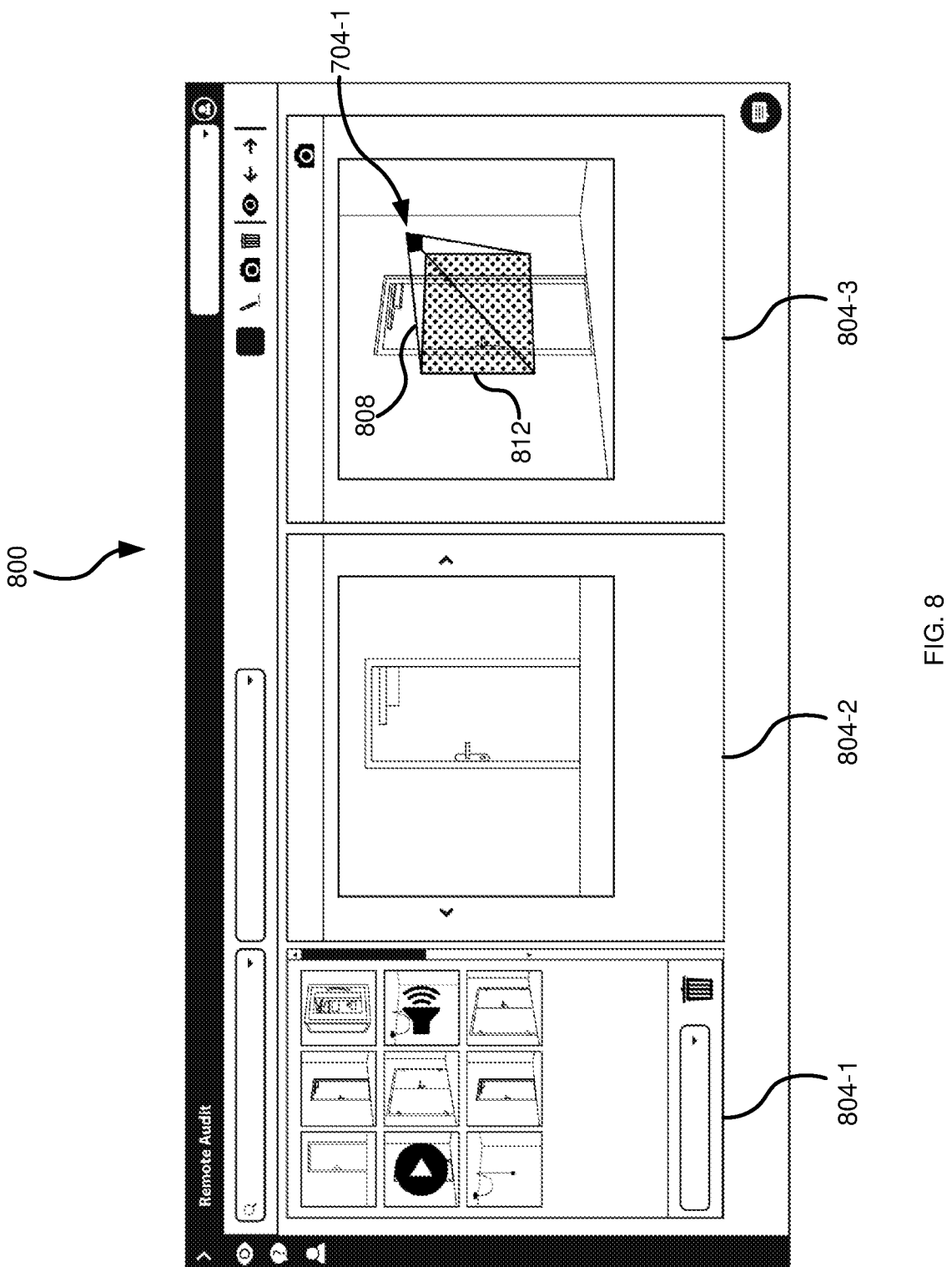
FIG. 8 depicts an example user interface for use during performance of block 260 of the method of FIG. 2.

Referring now to FIG. 8, an example user interface 800 at inspection station 112 is depicted. The user interface 800 includes panes 804-1, 804-2, and 804-3 to facilitate the inspection of space 102 using the space map and captured data.

First pane 804-1 can include a library of the data captured at each of the inspection capture points. For example, first pane 804-1 can include thumbnails of the images captured at the inspection capture points, thumbnails of a frame (e.g., the first frame) of videos captured at the inspection capture points, a speaker icon representing an audio clip captured at the inspection capture points, or other suitable representations. First pane 804-1 can additionally display a "data not captured" icon for inspection capture points for which data has not yet been captured. The inspector can interact with first pane 804-1 to select one of the thumbnails or icons, effectively selecting an inspection capture point (i.e., the inspection capture point at which the selected data was captured).

Second pane 804-2 presents the selected data. In the illustrated example, an image is selected, and accordingly, the image is displayed in second pane 804-2. In other examples, second pane 804-2 can provide video or audio playback capabilities when video or audio clips are selected. The inspector can therefore examine the captured data as appropriate. For example, the inspector can view the full resolution image, including zooming in and out of the image, or reviewing the video or audio clips.

Third pane 804-3 presents the space map, which in the present example is three-dimensional model 700, including the selected inspection capture point. To represent the selected inspection capture point, the corresponding data capture point indicator 704, in the present example, indicator 704-1, can be highlighted (e.g., in a different color or similar), and expanded to a pyramid 808. The apex of indicator 704-1 and pyramid 808 represent the location of the inspection capture point within space 102, and a base 812 of pyramid 808 represents an image plane of the image, and hence defines a direction of the image capture. The inspector can therefore easily determine the location, angle, and distance from which the selected image was taken.

Figure 9:
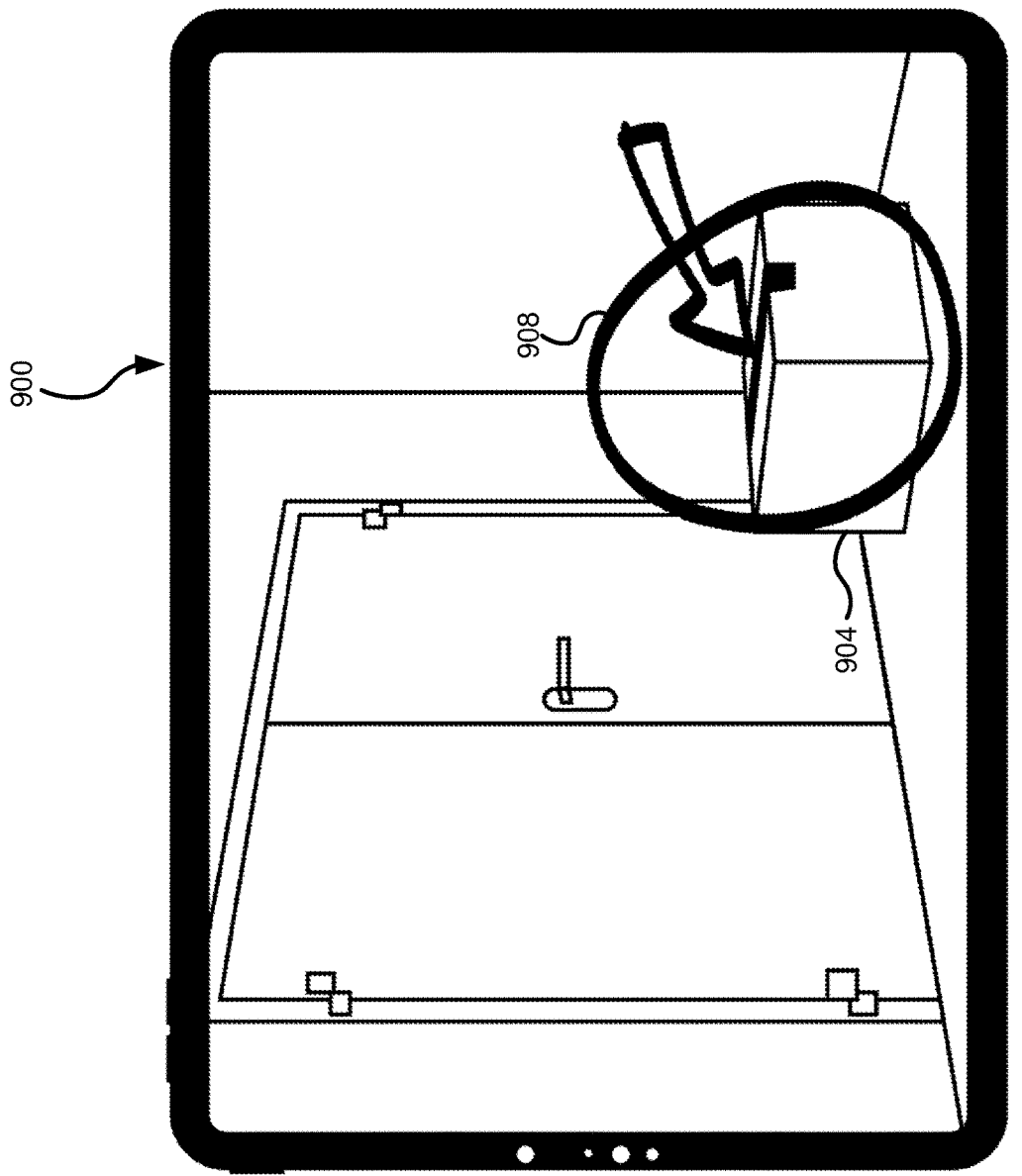
FIG. 9 depicts an example annotated image during execution of block 265 of the method of FIG. 2.

Referring to FIG. 9, an example captured image 900 annotated by an inspector is depicted. Captured image 900 a corner of a room with an object 904 in the corner. The inspector may not be able to determine what the object is, and hence can annotate image 900 by circling the object to generate an annotation 908. Annotation 908 is mapped to the nearest underlying surface—i.e., the floor and walls of the room behind object 904.

Figure 10A:
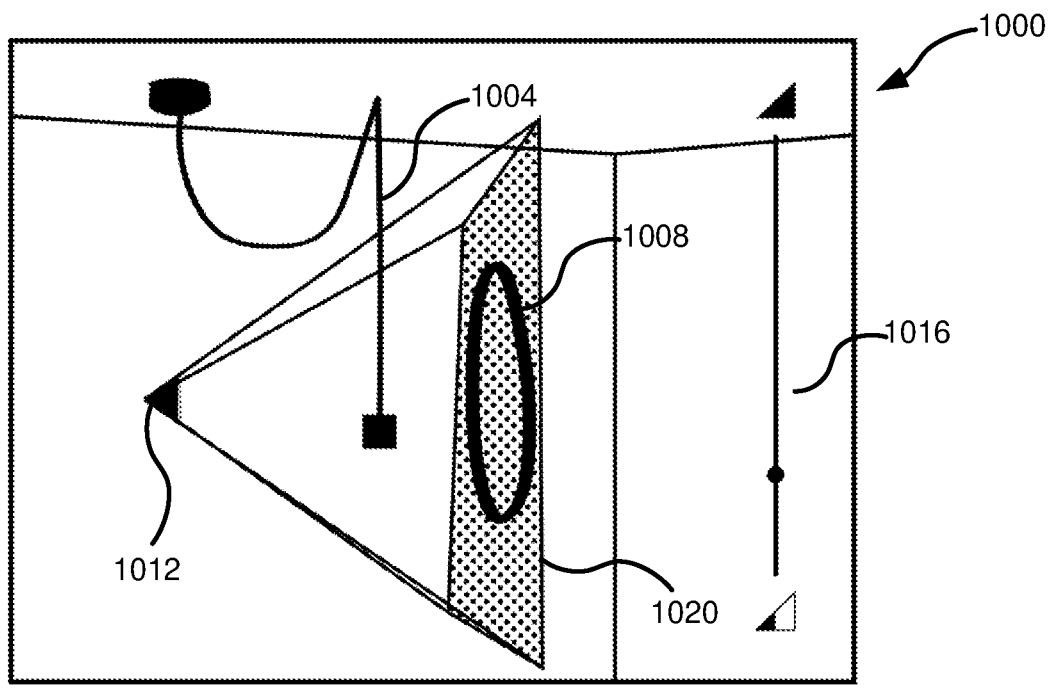
FIGS. 10A and 10B depict example annotated three-dimensional models during execution of block 265 of the method of FIG. 2.

Referring to FIG. 10A, a view of a three-dimensional model 1000 is depicted. The three-dimensional model 1000 shows a portion of a room with a wire 1004 extending from the ceiling of the room. The inspector may wish to draw attention to the unconnected and unsecured wire 1004 and hence can circle the wire to generate an annotation 1008. However, since wire 1004 extends from the ceiling, the inspector may wish to define an annotation plane to avoid having the annotation defined on the rear wall. Accordingly, the inspector can select an option to define the annotation plane. In response to said input, inspection station 112 provides a mechanism to allow the inspector to define a viewpoint frustum 1012 and a depth plane control slider 1016.

Viewpoint frustum 1012 can be selected based on the current view of three-dimensional model 1000 at the time the inspector defines annotation 1008. In other examples, after defining annotation 1008, the inspector can navigate within the three-dimensional model and set viewpoint frustum 1012 upon achieving the desired view. In addition to setting viewpoint frustum 1012, the current view can be used to set a viewpoint direction. After selecting viewpoint frustum 1012, inspection station 112 can rotate the view of the three-dimensional model to a side view relative to the direction of the selected viewpoint. Inspection station 112 can further display a guide pyramid 1020 extending from viewpoint frustum 1012 and terminating in a base 1024 perpendicular to the viewpoint direction. Base 1024 defines the annotation plane. The inspector can use depth plane control slider 1016 to move base 1024 to a desired depth relative to viewpoint frustum 1012. Thus, in response to receiving a defined depth from depth plane control slider 1016, inspection station 112 sets the annotation plane at the defined depth from viewpoint frustum 1012 perpendicular to the viewpoint direction. Annotation 1008 can then be mapped to the annotation plane.

Figure 10B:
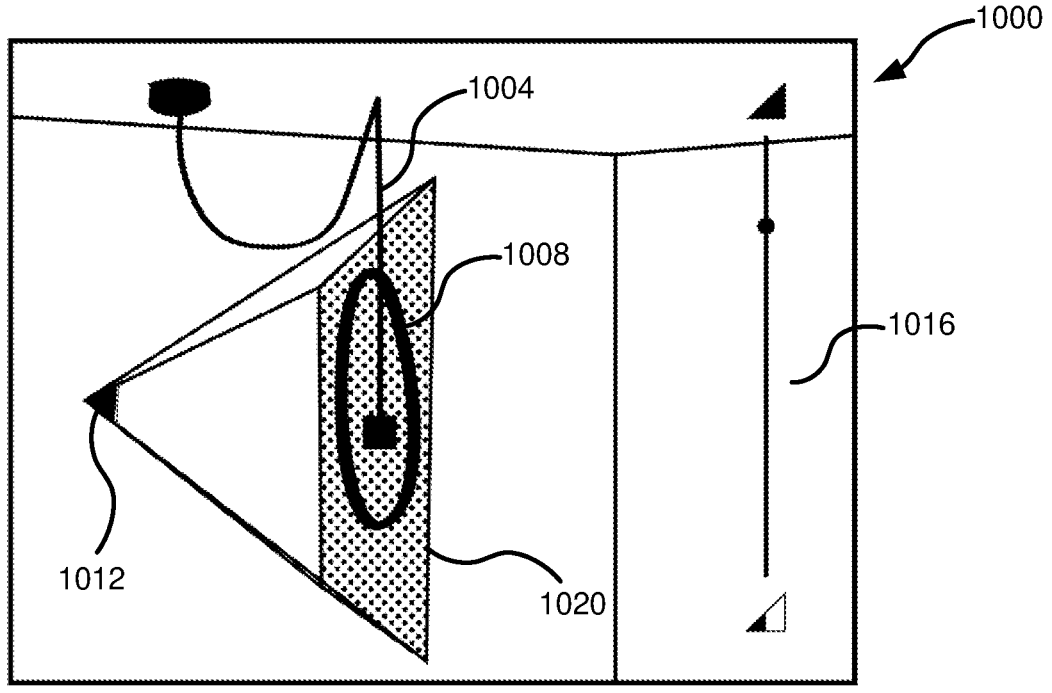

For example, in FIG. 10A, guide pyramid 1016 can be set to a default depth relative to viewpoint frustum 1012. In FIG. 10B, the inspector can control depth plane control slider 1016 to move base 1020 to correspond with the location of wire 1004, so that annotation 1008 is on substantially the same plane as wire 1004.

As described above, a system and method for enabling inspection, and in particular, remote inspection, of a space are provided. The system includes a data capture device deployed at the space to be inspected, an inspection station operated by an inspector, and a server to manage the inspection process and transmit data between the data capture device and the inspection station. Specifically, the data capture device can obtain a space map as well as defined inspection capture points from the server. A user of the data capture device can then use the data capture device to capture data representing the space at the specified inspection capture points. The captured data is transmitted through the server to the inspection station to be presented to an inspector. The inspector can utilize the space map to understand the context of the space as a whole, as well as the data captured at the inspection capture points to examine specific portions of the space.

The system is dynamic and allows for additional data capture requests and annotations which can appear as augmented reality items to allow for more intuitive understanding of the annotations. The system also allows for an asynchronous process rather than requiring availability of all parties at the same time. In some examples, in addition to asynchronous communication, the data capture device and the inspection station can additionally allow for real-time communication, for example using voice or video calls as well as screensharing to allow the inspector to view the current data capture view of the data capture device and make annotations in real time in the current data capture view of the data capture device.

The scope of the claims should not be limited by the embodiments set forth in the above examples but should be given the broadest interpretation consistent with the description as a whole.

The invention claimed is:

1. A system for enabling remote inspection of a space, the system comprising:

a server to store a space map of the space to be inspected; the space map having a first data size, the server to define one or more inspection caption points, each inspection capture point including a frustum defined by a location, an orientation and depth;

a data capture device in communication with the server, the data capture device to:

receive the space map at the first data size;

receive the one or more inspection caption points;

capture additional data representing the space within the frustum for each of the inspection capture points, the additional data being constrained to the frustum of each inspection capture point and omitted for regions of the space outside all of the frustums, the additional data having a second data size, and send the captured data and the additional data to the server; and an inspection station in communication with the server, the inspection station to:

obtain the space map and the captured additional data associated with the inspection capture points from the server;

locate the inspection capture points within the space map; and present the space map and the captured data for inspection of the space;

wherein the first data size plus the second data size is less than a third data size, the third data size including a complete space map including data for the regions omitted from the additional data.

2. The system of claim 1, wherein the data capture device is further configured to receive instructions to orient the data capture device relative to the space map prior to capturing the data representing the space.

3. The system of claim 1, wherein the data representing the space comprises one or more of: image data, video data, audio data, and sensor data.

4. The system of claim 1, wherein the data capture device is further configured to, when the data capture device is oriented at the at least one inspection capture point, render a guide frame for aligning the data capture device with a direction specified by at least one inspection capture point.

5. The system of claim 4, wherein the guide frame is rendered as an overlay to a current data capture view of the data capture device.

6. The system of claim 4, wherein the data capture device to is further configured to automatically capture the data representing the space when the data capture device is aligned in the direction specified by the at least one inspection capture point.

7. The system of claim 1, wherein the data capture device is further configured to receive instructions to render an inspection capture point icon at the at least one inspection capture point.

8. The system of claim 7, wherein the inspection capture point icon is rendered as an overlay to a current data capture view of the data capture device.

9. The system of claim 1, wherein the inspection station is further to generate inspection result data comprising one or more of: annotations, comments, regulatory links, and new data capture requests.

* * * * *